United States Patent [19]

Honda et al.

[11] Patent Number: 5,497,109

[45] Date of Patent: Mar. 5, 1996

[54] INTEGRATED CIRCUIT WITH REDUCED CLOCK SKEW

[75] Inventors: Nubuhiko Honda; Toyohiko Yoshida; Yukihiko Shimazu, all of Itami, Japan

[73] Assignee: Mitsubishi Denki Kabushiki Kaisha, Tokyo, Japan

[21] Appl. No.: 252,520

[22] Filed: Jun. 1, 1994

Related U.S. Application Data

[63] Continuation of Ser. No. 40,244, Mar. 30, 1993, Pat. No. 5,376,842.

[30] Foreign Application Priority Data

Nov. 14, 1989 [JP] Japan ..................... 1-296840

[51] Int. Cl.⁶ ..................... H03K 19/02; H01L 25/00
[52] U.S. Cl. ..................... 326/93; 326/101; 327/293
[58] Field of Search ..................... 307/465, 465.1, 307/480–481, 303, 303.1–303.3, 443; 326/93, 101; 327/293, 565

[56] References Cited

U.S. PATENT DOCUMENTS 4,958,092 9/1990 Tanaka ..................... 307/443
5,122,693 6/1992 Honda ..................... 307/443
5,278,466 1/1994 Honoa ..................... 307/480
5,376,842 12/1994 Honoa ..................... 326/93

*Primary Examiner*—Edward P. Westin
*Assistant Examiner*—Andrew Sanders
*Attorney, Agent, or Firm*—Larry Mendenhall; Townsend and Townsend and Crew

[57] ABSTRACT

Integrated circuits in which a phase difference between the external and internal clocks can be reduced by decreasing transistor stages from the input of an external clock to the output of an internal clock drive stages and also noise can be reduced which is generated when the clock driver drives at a high speed the internal clock having a heavy load and the noise can be prevented from propagation to other portions to avoid having a bad effect on other circuits, and further the internal clock having the same phase can be supplied to each part of the chip even at a high operating frequency by minimizing skew of the internal clock signal on the chip and still further a demand current can be reduced by eliminating a passing current of the internal clock signal driver.

1 Claim, 8 Drawing Sheets

5,497,109

INTEGRATED CIRCUIT WITH REDUCED CLOCK SKEW

This is a continuation of application Ser. No. 08/040,244 filed Mar. 30, 1993, now U.S. Pat. No. 5,376,842.

BACKGROUND OF THE INVENTION

1. Field of the Invention

This invention relates to an integrated circuits and, more particularly, to the same using a high frequency clock signal for high speed operations.

2. Description of Related Art

FIG. 1 is a schematic diagram showing a clock distribution system of the microprocessor described in Masuda et al. "The TRON specified microprocessor TX1 for built-in control" ("NIKKEI ELECTRONICS" Sep. 5, 1988). In FIG. 1, numeral 301 denotes a trunk buffer, 302, a branch buffer, 303, a leaf buffer and 304, a flip-flop respectively.

The clock distribution system shown in FIG. 1 employs a tree structure with three hierarchies. Concretely, an external clock is first inputted to the trunk buffer 301 and the output of the trunk buffer 301 is inputted to the branch buffers 302, thus the clock is relayed and further the outputs of the branch buffers 302 are inputted to the leaf buffers 303, the output of which drive loads, that is, the flip-flops 304.

In the circuit configuration of FIG. 1, in order to minimize differences in gate delay times among the buffers, numbers of the leaf buffers driven by the respective branch buffers, numbers of the flip-flops driven by the respective leaf buffers and wiring load capacities are equalized.

As a degree of integration of the recent integrated circuits becomes high, the wiring of the integrated circuit is elongated and the fan out (load connected to a gate output) is increased, thus the load driven by the clock driver is becoming heavy. Further, owing to the high speed operation of the integrated circuit, a clock frequency which the clock driver is to output is becoming high.

Thus, when an internal clock having a heavy load is driven at a high speed, switching noise arises due to a large switching current and this noise has a bad effect on other circuits.

Further, as the clock frequency becomes high, clock skew on a chip due to delay for wiring can not be neglected and it becomes hard to feed the internal clock having the same phase to each part of the chip.

In addition, as the clock frequency becomes high, the power consumption per unit time increases due to the passing current generated in the clock driver. This requires a large size transistor as the clock driver to drive the heavy lead, thus causing an important problem.

In the above conventional configuration of FIG. 1, the clock distribution system employs the three hierarchies tree structure to reduce the lead driven by the respective drivers. In addition, the lead capacity driven by each buffer in the same hierarchy is equalized to reduce the clock skew.

However, in the example of FIG. 1, because of increase in a number of driver stages delay of the internal clock to the external clock becomes large. Further it is required to adjust the lead capacity driven by each driver to avoid generation of the skew among the output signal of each driver. To this end, in the case of employing the clock distribution system of FIG. 1, the circuit design becomes complicated and burdens the engineers with a heavy lead of the designing.

In view of the above problem, the inventions of Japanese Patent Application Laid-Open No. 60-257543 (1985) and Japanese Patent Application Laid-Open No. 1-112808 (1989), for example, have been proposed.

The invention of Japanese Patent Application Laid-Open No. 60-257543 (1985) is "characterized by comprising a wave shaping circuit for shaping a synchronous signal wave, a plurality of functional circuit portions each operation of which is controlled in synchronization with the output of the wave shaping circuit, a looped first wiring which surrounds a plurality of said functional circuit portions and is fed the output of said wave shaping circuit, a plurality of second wirings each of which takes out the synchronous signal at any point of said first wiring and supply it to each of a plurality of said functional circuit portions".

The invention of Japanese Patent Application Laid-Open No. 60-257543 (1985) will be concretely explained referring to FIG. 2 showing a block diagram of an IC chip.

In FIG. 2, an outermost frame shows one IC chip, one peripheral side of which is provided with a clock driver 311. The clock driver 311 shapes the wave form of a clock signal φ for synchronization supplied from the exterior of the IC chip. The shaped clock signal φ is fed to a looped wiring 330.

The interior of the IC chip is provided with a memory circuit 312 such as a ROM or RAM which is controlled in synchronization with the clock signal φ, a logic portion 313 for controlling the memory circuit 312 and other logic portions 314 through 319.

The looped wiring 330 is configured of a looped wiring portion 330A surrounding the abovementioned memory circuit 312 and logic portion 313, a looped wiring portion 330B surrounding the logic portions 314 and 315, a looped wiring portion 330C surrounding the logic portion 316, and a looped wiring portion 330D surrounding the logic portions 317 and 318. Each of the looped wiring portions 330A through 330D and each of the logic portions 313 through 319 are connected by the second wirings 331 through 344, respectively.

In the above invention of Japanese Patent Application Laid-Open No. 60-257543 (1985), the clock signal is fed to each of the logic portions 313 through 319 with the looped wiring 330, thus the phase difference of the clock signals does not become large. Therefore, it is possible to somewhat control generation of the clock skew, but with only provision of the looped wiring 330, it can not cope with other problems.

Further, the invention of Japanese Patent Application Laid-Open No. 1-112808 (1989) discloses "an integrated circuit having an external clock input terminal, a plurality of driver circuits for internal clock signal lines for supplying an inputted clock from the external clock input terminal to the internal clock signal lines, and a plurality of wirings for connecting between said external clock input terminal and a plurality of said driver circuits for the internal clock signal lines, wherein a plurality of the wirings have substantially the respective same wiring impedances".

The invention of Japanese Patent Application Laid-Open No. 1-112808 (1989) will be explained referring to FIG. 3 showing an integrated circuit configuration of the invention.

In FIG. 3, numeral 401 through 403 denote driver circuits, 404, an input buffer, 405, an external clock input terminal, 406, a capacitor, 408, a clock signal line, and 412 through 414, wirings.

The clock inputted from the external clock input terminal 405 is supplied to the driver circuit 403 disposed near the external clock input terminal 405 through the input buffer 404 and the wiring 414.

The clock inputted to the input terminal 405 is supplied to the driver circuit 401 through the input buffer 404 and the wiring 412, simultaneously supplied to the driver circuit 402 through the input buffer 404 and the wiring 413. The clock is supplied to the clock signal line 408 by the driver circuits 401, 402 and 403. The wiring 414 is connected with the capacitor 406.

In such the invention as Japanese Patent Application Laid-Open No. 1-112808 (1989), the wiring impedances of the respective wirings 412, 413 and 414 from the input buffer 404 to the respective driver circuits 401, 402 and 403 are substantially equalized by suitably setting the capacitor 406 capacitance. Therefore, the clocks attenuations and phase shifts in the wiring 412, 413 and 414 are equalized.

However, it is considered that in the invention of Japanese Patent Application Laid-Open No. 1-112808 (1989), the clock's phase difference arises in many logic circuits connected from the clock signal wire line 408 to further distances, thus the above invention can not give the solutions of the present problems.

SUMMARY OF THE INVENTION

The present invention is attained in view of the above situation, and it is an object of the present invention to provide an integrated circuit which can reduce transistor stages from the input of an external clock to an internal clock drive stages and can minimize a phase difference between the external and internal clocks.

It is a further object of the invention to provide an integrated circuit which can reduce noise generated when the clock driver drives at a high speed the internal clock having a heavy load and simultaneously can prevent the noise from propagation to other portions to avoid having bad effect on an other circuits.

It is another object of the invention to provide an integrated circuit which can minimize skew of an internal clock signal on a chip and can supply the internal clock signal having the same phase to each portion on the chip even at a high operating frequency.

It is a still further object of the invention to provide an integrated circuit which can eliminate a passing current of the internal clock signal driver and minimize a demand current.

The integrated circuits of the invention are based on the following inventions of the first through the seventh (as for reference symbols, refer to FIG. 5).

In the first invention, a wiring of a first potential and a wiring of a second potential both connected to a clock driver which outputs on internal clock signal under the control of a clock control signal are separated from a wiring connected to a clock control portion which outputs a clock control signal in response to an external clock signal and also separated from wirings connected to other circuits.

That is, the integrated circuit of the first invention comprises:

a first circuit (10) which is connected to a wiring of the first potential and a wiring of the second potential and outputs a clock control signal (206 through 215) in response to an inputted external clock signal (EXCLK);

a second circuit (9) which is connected to a wiring of the first potential and a wiring of the second potential and outputs an internal clock signal (216 through 219) in response to said clock control signal (206 through 215); and a third circuit (1 through 8) which is connected to a wiring of the first potential and a wiring of the second potential and operates in response to said internal clock signal (216 through 219);

wherein said second circuit (9) is connected to the wiring of the first potential (24) and the wiring of the second potential (23) which are different from those connected to said first and third circuits (10 and 1 through 8).

Therefore, by the first invention, the clock driver which outputs the internal clock signal is supplied with power and a grounding with the dedicated wiring of the first potential and wiring of the second potential separated from the clock control portion and the other circuits.

In the second invention, in addition to the first invention, the transistor which constitutes the clock driver is separated from a transistor which constitutes the other circuit by surrounding the former transistor with a guard ring.

That is, the integrated circuit of the second invention comprises:

a first circuit (10) which is connected to a wiring of a first potential and a wiring of a second potential and outputs a first clock control signal (207, 209, 212 and 214) and a second clock control signal (206, 208, 211 and 213) in response to an inputted external clock signal (EXCLK);

a second circuit (9) including a first transistors (117, 119, 121 and 123) group which is connected to a wiring of the first potential and receives said first clock control signal (207, 209, 212 and 214), a first guard ring (30) which surrounds said first transistors group to separate it from other transistors, a second transistors (116, 118, 120 and 122) group which is connected to a wiring of the second potential and receives said second clock control signal (206, 208, 211 and 213), a second guard ring (29) which surrounds said second transistors group to separate it from other transistors, and outputting an internal clock signal (216 through 219); and a third circuit (1 through 8) which is connected to a wiring of the first potential and a wiring of the second potential and operates in response to said internal clock signal (216 through 219);

wherein said first and second transistors groups of said second circuit (9) are connected to the wiring of the first potential (24) and the wiring of the second potential (23) which are different from those connected to said first and third circuits (10 and 1 through 8).

Therefore, by the second invention, the clock driver which outputs the internal clock signal is surrounded by the guard ring and separated from other portions on the chip.

In the third invention, in addition to the first invention, a wiring pad of a first potential and a wiring pad of a second potential which are respectively connected to a wiring of the first potential and a wiring of the second potential of the clock driver are bonded with at least two wires on the exterior of the chip.

That is, the integrated circuit of the third invention comprises:

a first circuit (10) which is connected to a wiring pad of a first potential through a wiring of the first potential and connected to a wiring pad of a second potential through a wiring of the second potential respectively, and outputs a first clock control signal (207, 209, 212 and 214) and a second clock control signal (206, 208, 211 and 213) in response to of the inputted external clock signal (EXCLK);

a second circuit (9) including a first transistors (117, 119, 121 and 123) group which is connected through a wiring of the first potential (28) to a wiring pad of the first potential pad bonded with a plurality of wires (32) and also connected to said first clock control signal (207, 209, 212 and 214) and a second transistors (116, 118, 120 and 122) group which is connected through a wiring of the second potential (27) to the wiring pad of the second potential bonded with a plurality of wires (31) and also connected to said second clock control signal (206, 208, 211 and 213), and outputting an internal clock signal (216 through 219); and a third circuit (1 through 8) which is connected to a wiring pad of the first potential through a wiring of the first potential and connected to a wiring pad of the second potential through a wiring of the second potential and operates in response to said internal clock signal (216 through 219);

wherein said first and second transistors groups of said second circuit (9) are connected to the wiring pad of the first potential (22) and the wiring pad of the second potential (21) which are different from those connected to said first and third circuits.

Therefore, by the third invention, the clock driver which outputs the internal clock signal is supplied with-power and grounding, through the dedicated wiring of first potential and wiring of the second potential, from the dedicated power source pad and grounding pad bonded with a double wiring.

In the fourth invention, a clock control portion which generates the clock driver control signal is disposed near one side of the chip and the clock driver is divided into two parts and both the parts are oppositely disposed near opposite sides interposing the clock control portion.

That is, the integrated circuit of the fourth invention is formed on a single rectangle chip and comprises:

a first circuit (10) which outputs a clock signal (206 through 215) in response to the external clock signal (EXCLK) inputted from the exterior through an external clock signal pad (11); and two of a second circuit which outputs an internal clock signal (216 through 219) in cooperation with each other in response to said clock signal (206 through 215);

wherein said first circuit (10) is formed in a first area near a first side (U) of said rectangle, one of said second circuits (9a or 9b) is formed in a second area near a second side (L or R) which is one of two sides interposing said first side (U) of said rectangle, the other of said second circuits (9b or 9a) is formed in a third area near a third side (R or L) which is the other of the two sides interposing said first side (U) of said rectangle and opposing said second side (L or R).

Therefore, in the fourth invention, the clock control portion disposed along the first side of the chip outputs the clock control signal, and in response to input of this signal, the bisected clock drivers that are disposed along the opposing second and third sides interposing the first side output the internal clock signals.

In the fifth invention, in addition to the fourth invention, a loop trunk line for the clock is provided which is disposed in a state of a loop on the chip and has a large wire width and is connected with both of the two-divided clock drivers. Further, a plurality of clock branch lines are provided which are branched from the clock loop trunk line and have each small wire width and are connected with each of other circuits.

That is, the integrated circuit of the fifth invention is formed on a single rectangular chip and comprises:

a clock loop trunk line (12) which is formed in a state of a loop and has a first wire width;

a plurality of clock branch lines (13) each of which has a second wire width narrower than said first wire width and is connected with said clock loop trunk line (12);

two of a first circuit (9a and 9b) which generates, in cooperation with each other, the internal clock signal (216 through 219) in response to the external clock signal (EXCLK) inputted from the exterior through an external clock signal pad (11); and a second circuit (1 through 8) which operates in response to said internal clock signal. (216 through 219 );

wherein one of said first circuits (9a or 9b) is formed in a first area which is near the first side (L or R) of said rectangle and connected with said clock loop trunk line (12), the other of said first circuits (9b or 9a) is formed in a second area which is near the second side (R or L) opposing said first side (L or R) and connected with said clock loop trunk line (12), and said second circuit (1 through 8) is formed in an area between said opposing first area and second area and connected with said clock branch line (13) respectively.

Therefore, by the fifth invention, the internal clock signals, outputted from the two-divided clock drivers disposed along the opposing two sides of the chip, are supplied to each circuit on the chip through the clock loop trunk line and narrower clock branch lines.

In the sixth invention, the integrated circuit is provided with clock branch lines for feeding back the internal clock signal, a first inverter circuit which is set to a lower logical voltage threshold than the standard for input of the internal clock signal from the clock branch line, a second inverter circuit which is set to a higher logical voltage threshold than the standard for input of the internal clock signal from the clock branch line, a circuit which outputs a first control signal in response to the first inverter output, a circuit which outputs a second control signal in response to an output of the second inverter, a MOS transistor which makes the level of the internal clock signal low level in response to the first control signal, and a MOS transistor which makes the level of the internal clock signal high level in response to the second control signals.

That is, the integrated circuit of the sixth invention comprises:

a clock wiring (12 and 13) which transfers a clock signal (216 and 218) with the loop forming clock loop trunk line (12) and a plurality of clock branch lines (13) connected to said clock loop trunk line (12);

a circuit which is connected to said clock branch line (13) and operates in response to said clock signal (216 and 218);

a driver circuit (105 and 109) including a first MOS transistor (117 and 212) which is connected to a power source of a first potential (28), said clock loop trunk line (12) and a first control signal (207 and 212), and changes the level of said clock signal (216 and 218) to said first potential when said first control signal (207 and 212) is asserted, and a second MOS transistor (116 and 120) which is connected to a power source of a second potential (27), said clock loop trunk line (12) and a second control signal (206 and 211), and changes the level of said clock signal (216 and 218) to said second potential when said second control signal (206 and 211) is asserted; and a clock driver control circuit (10) including a first inverter circuit (113 and 115) whose input is connected with said clock branch line (13) and which has a first logical threshold, a second inverter circuit (114 and 116) whose input is connected with said clock branch line (13) and which has a second logical threshold different from said first logical threshold, a circuit (104 and 108) which outputs said first control signal (207 and 212) in response to the output of said first inverter circuit (113 and 115), and a circuit (104 and 108) which outputs said second control signal (206 and 211) in response to the output of said second inverter circuit (114 and 116).

Therefore, by the sixth invention, the MOS transistor which changes the internal clock signal to low level is feed back-controlled in response to the internal clock signal inputted from the clock branch line through the first inverter set to a low logical voltage threshold, and the MOS transistor which changes the internal clock signal to high level is feed back-controlled in response to the internal clock signal inputted from the clock branch line through the second inverter set to a high logical voltage threshold.

In the seventh invention, the integrated circuit is provided with clock control means which receives the external clock signal and the internal clock signal, and asserts a main driver control signal when the external clock signal changes, and after the corresponding internal clock signal has changed, outputs a subdriver control signal in response to negation of the main driver control signal and the external control signal, a main driver which drives the internal clock signal while the main driver control signal is asserted, and a subdriver which assists the main driver to drive the internal clock signal in response to the subdriver control signal.

That is, the integrated circuit of the seventh invention comprises:

a first circuit (10) which outputs a control signal (206) and a clock signal (210) in response to the external clock signal (EXCLK) inputted from the exterior and an internal clock signal (216);

a main driver circuit (105 or 106) which outputs said internal clock signal (216) in response to said control signal (206); and a subdriver circuit (107) which assists said main driver circuit (105) to output said internal clock signal (216) in response to said clock signal (210);

wherein said first circuit (10) asserts said control signal (206) when said external clock signal (EXCLK) changes from the first potential (L or H) to the second potential (H or L) and simultaneously changes said clock signal (210) from the second (or the first) potential to the first (or the second) potential.

said main driver circuit (105) changes said internal clock signal (216) to the second (or the first) potential when said control signal (206) is asserted, said subdriver (107) changes said internal clock signal (216) to said second (or first) potential when said clock signal (210) is at said first (or second) potential, said first circuit (10) also negates said control signal (206) when said internal clock signal (216) changes to said second (or first) potential.

Therefore, by the seventh invention, the clock control portion asserts the main driver control signal when the external clock signal changes, thereby the main driver drives the internal clock signal. In response to change of the internal clock signal by the main driver, the clock control portion negates the main driver control signal, thereby the main driver finishes the drive of the internal clock signal. Simultaneously, the clock control portion outputs the subdriver clock signal in response to the external clock signal. Thus, after the main driver control signal has been negated and the main driver has finished drive of the internal clock signal, the subdriver continues to drive the internal clock signal until the external clock signal changes next.

The above and further objects and features of the invention will more fully be apparent from the following detailed description with accompanying drawings.

DESCRIPTION OF THE PREFERRED EMBODIMENTS

Now will be described below an embodiment of the present invention in detail with reference to the attached drawings.

(1) "Configuration of Function Block"

Figure 1:
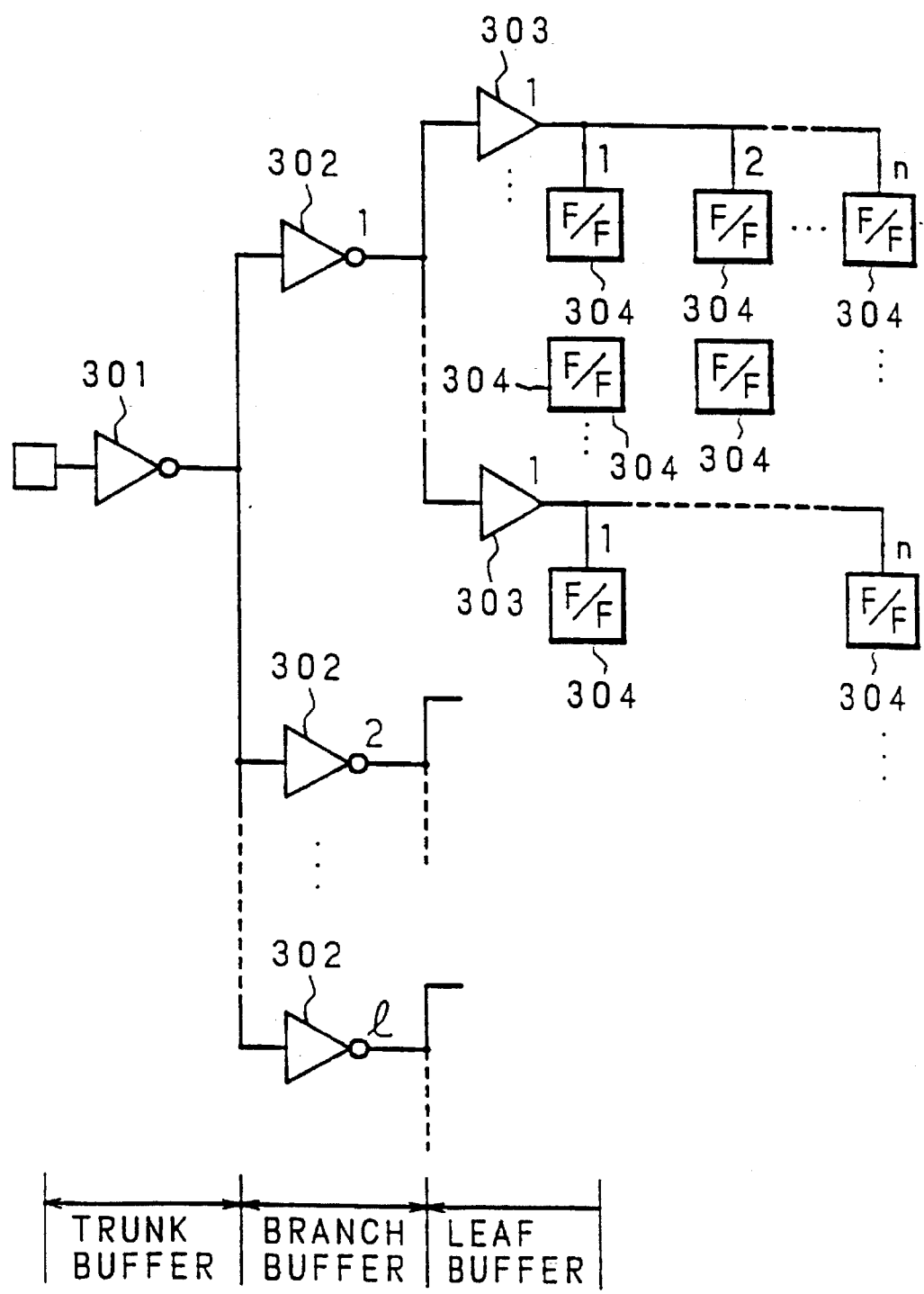
FIG. 1, FIG. 2 and FIG. 3 are schematic diagrams showing the methods of clock distribution in the conventional integrated circuits.
Figure 2:
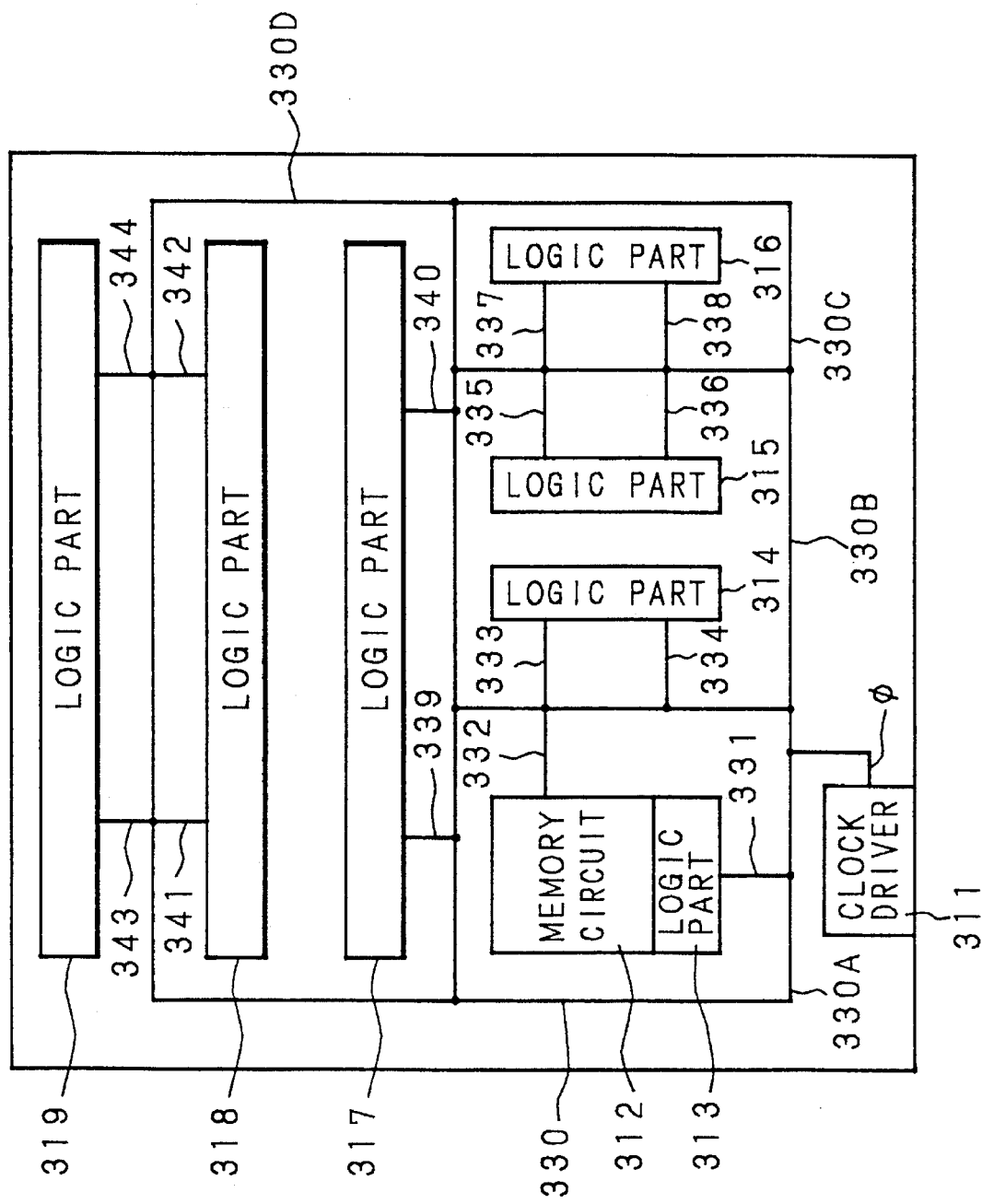
Figure 3:
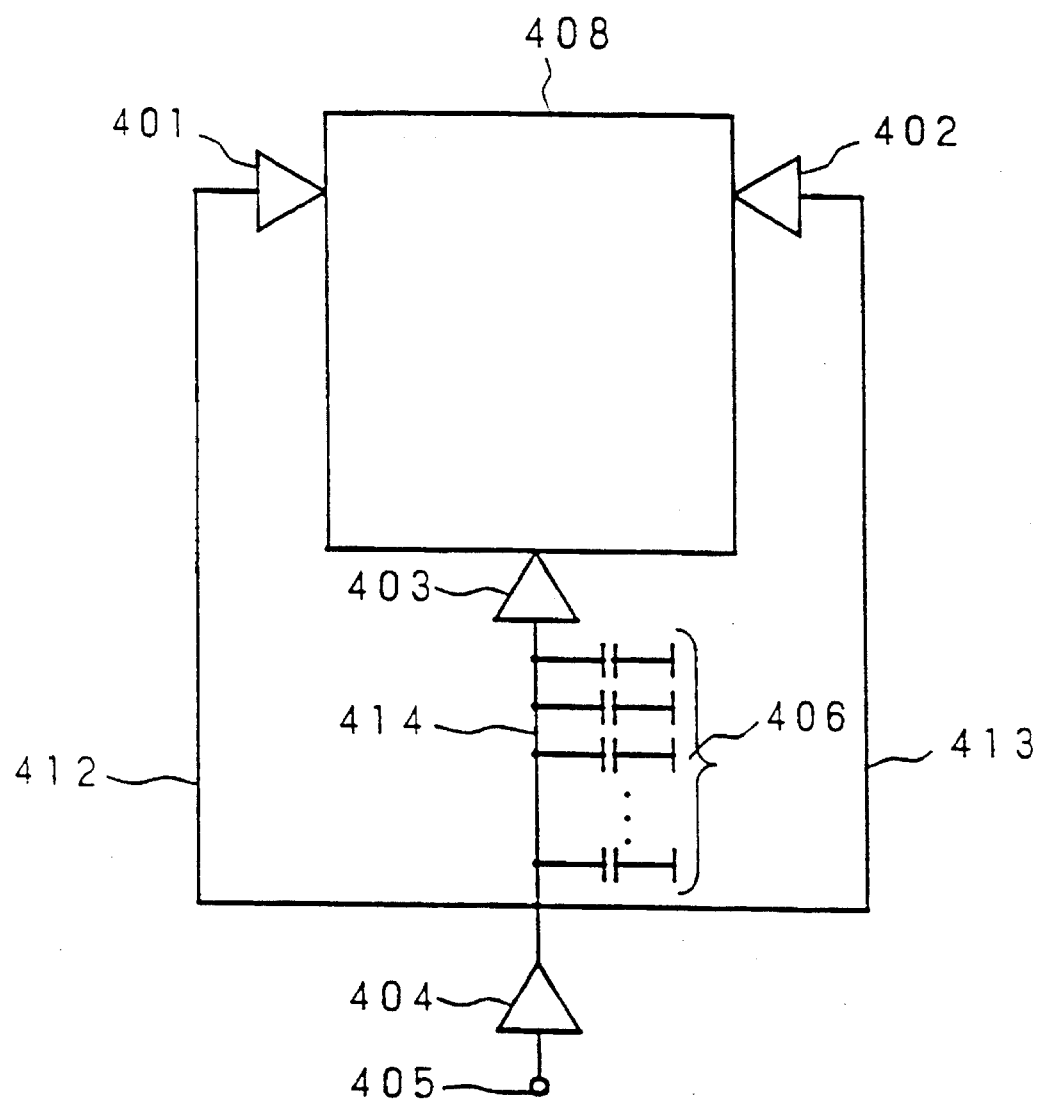
Figure 4:
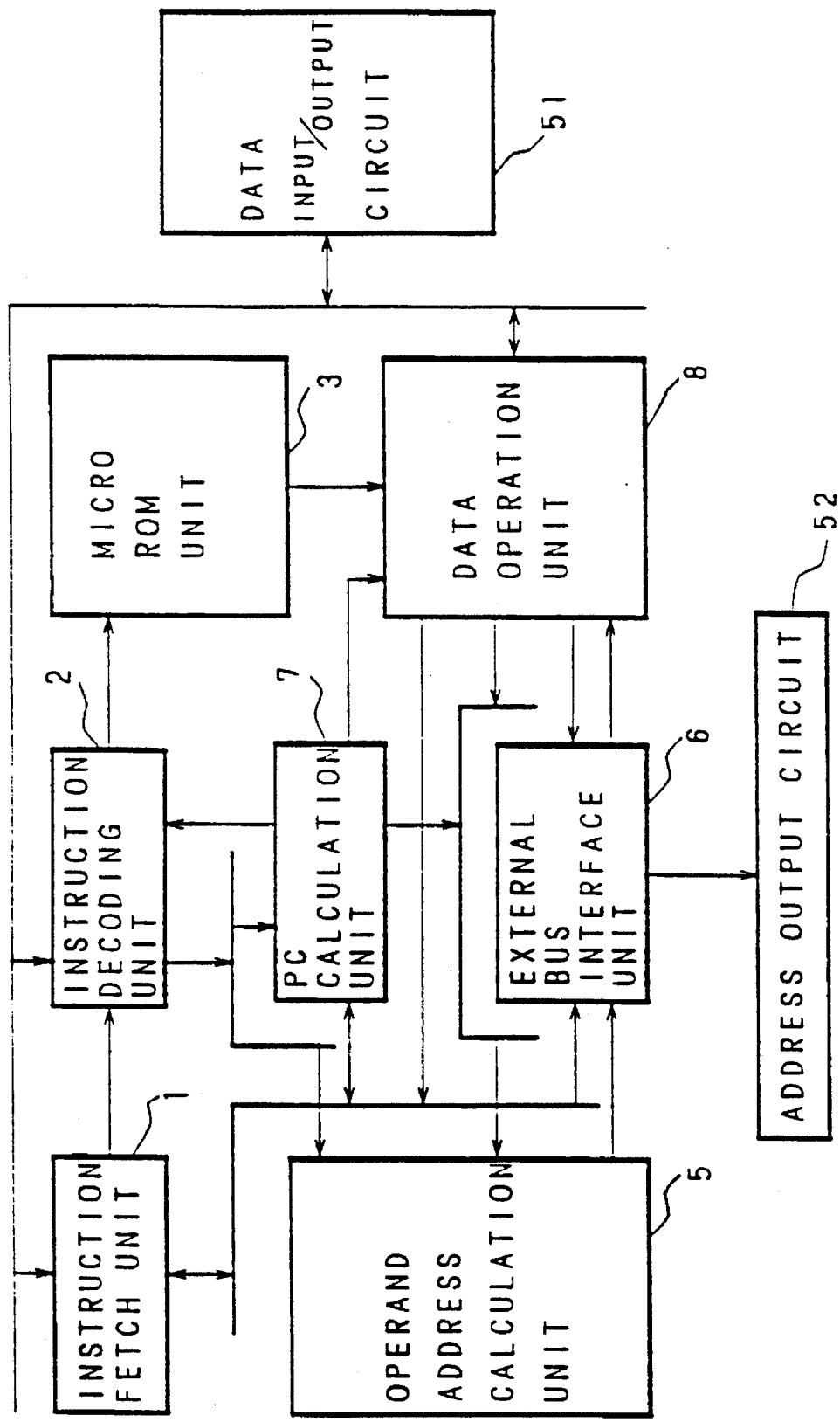
FIG. 4 is a block diagram showing a functional configuration of an integrated circuit of the invention.

FIG. 2 is a block diagram showing a configuration of the integrated circuit of the present invention.

The interior of the integrated circuit of the present invention is functionally divided roughly into an instruction fetch unit 1, an instruction decoding unit 2, a PC calculation unit 7, an operand address calculation unit 5, a micro ROM unit 3, a data operation unit 8 and an external bus interface unit 6.

In FIG. 2, in addition to the above-described units, an address output circuit 52 for outputting address to the exterior of a CPU and a data input/output circuit 51 for inputting and outputting data from and to the exterior of the CPU are shown being separated from the other function block units.

(1.1) "Instruction Fetch Unit"

The instruction fetch unit 1 which comprises a branch buffer, an instruction queue and a controlling unit thereof, determines the address of an instruction to be fetched next and fetches the instruction from the branch buffer or a memory outside the CPU. It also performs instruction registering to the branch buffer.

The branch buffer is small-scaled, therefore operating as a selective cache. Detailed description on the operation of the branch buffer is disclosed in the Japanese Patent Application Laid-Open No. 63-56731 (1988) (incorporated herein by reference).

The address of an instruction to be fetched next is calculated by a dedicated counter as the address of the instruction to be inputted to an instruction queue. In the case where a branch or jump is generated, an address of a new instruction is transferred from the PC calculation unit 7 or the data operation unit 8.

In the case where an instruction is fetched from a memory outside the CPU, the address of the instruction to be fetched is outputted from the address output circuit 52 to the outside of the CPU through the external bus interface unit 6, and an instruction code is fetched from the data input/output circuit 51.

Then, among the instruction codes in buffering, the instruction code to be decoded next is outputted to the instruction decoding unit 2.

(1.2) "Instruction Decoding Unit"

In the instruction decoding unit 2, basically an instruction code is decoded on a 16-bit (half word) basis. This block comprises an FHW decoder for decoding an operation code included in the first half word, an NFHW (not first half word) decoder for decoding an operation code including in the second and the third half words, and an addressing mode decoder for decoding an addressing mode.

There are also a second stage decoder which further decodes outputs of the FHW decoder and the NFHW decoder and calculates an entry address of the micro ROM, a branch predicting mechanism for performing branch prediction of a conditional branch instruction, and an address calculation conflict checking mechanism for checking pipeline conflict in calculating an operand address.

The instruction decoding unit 2 decodes the instruction code being inputted from the instruction fetch unit 1 by 0 bytes through 6 bytes per one clock. Among the results of decoding, information on operation in the data operation unit 8 is outputted to the micro ROM unit 3, information on operand address calculation is outputted to the operand address calculation unit 5, and information on PC calculation is outputted to the PC calculation unit 7, respectively.

(1.3) "Micro ROM Unit"

The micro ROM unit 3 comprises a micro ROM for storing microprograms which mainly controls the data operation unit 8, a micro sequencer, and a micro instruction decoder.

A micro instruction is read out from the micro ROM once per two clocks. The micro sequencer accepts processings of exception, interruption and trap (these three are generally called EIT) in a hardware manner in addition to the sequential processings shown by the microprograms. The micro ROM unit 3 also controls a store buffer.

To the micro ROM unit 3, there are inputted flag information generated by interruption independent of the instruction code or by the result of operation execution, and output of an instruction decoding unit such as output second stage decoder. Output of the micro decoder is mainly given to the data operation unit 8, but some information such as information of stopping other preceding processing due to execution of a jump instruction is outputted also to other blocks.

(1.4) "Operand Address Calculation Unit"

The operand address calculation unit 5 is controlled in a hardwired manner by information on operand address calculation outputted from the address decoder of the instruction decoding unit 2 or the like. In this operand address calculation unit 5, substantially all processing on operand address calculations is performed. Checking is conducted to determined whether or not the address of memory access for memory indirect addressing and the operand address can be within an I/O area mapped in the memory.

The result of address calculation is sent to the external bus interface unit 6.

The values of the general-purpose register and the program counter required for address calculation are inputted from the data operation unit 8.

In performing the memory indirect addressing, the memory address to be referred is outputted from the address output circuit 52 to the outside of the CPU through the external bus interface unit 6, and the indirect address value inputted from the data input/output unit 51 is fetched through the instruction decoding unit 2.

(1.5) "PC Calculation Unit"

The PC calculation unit 7 is controlled in a hardwired manner using information on PC calculation outputted from the instruction decoding unit 2. The PC calculation unit 7 calculates the PC value of an instruction.

The data processor of the integrated circuit of the present invention has a variable-length instruction set, and the length of that instruction can be found only after the instruction is decoded. For this reason, the PC calculation unit 7 generates the PC value of the next instruction by adding the length of the instruction outputted from the instruction decoding unit 2 to the PC value of the instruction in decoding.

In the case where the instruction decoding unit 2 decodes a branch instruction and directs a branch in the decoding stage, the PC value of a branch destination instruction is calculated by adding a branch displacement in place of the instruction length to the PC value of the branch instruction.

In the data processor of the present invention, performing a branch in the instruction decoding stage in response to the branch instruction is called prebranch.

A detailed description of this prebranch approach is disclosed in Japanese Patent Application Laid-Open No. 63-59630 (1988) and Japanese Patent Application Laid-Open No. 63-55639 (1988) (incorporated herein by reference).

The result of calculation in the PC calculation unit 7 is outputted as the PC value of each instruction together with the result of-decoding of the instruction, and in addition, is outputted to the instruction fetch unit 1 as the address of the instruction to be decoded next at pre-branch.

Also, it is used for the address for branch prediction of the instruction to be decoded next in the instruction decoding unit 2.

A detailed description of the branch prediction approaches is disclosed in Japanese Patent Application Laid-Open No. 63-175934 (1988) (incorporated herein by reference).

(1.6) "Data Operation Unit"

The data operation unit 8 is controlled by microprograms, and executes the operation required for realizing the function of each instruction by means of registers and an arithmetic unit according to output information of the micro ROM unit 3.

There are two cases, in one case where the data operation unit 8 obtains the address calculated in the operand address calculation unit 5 through the external bus interface unit 6, and in the other case where the data operation unit 8 obtains the operand fetched by the address previously obtained by itself through the data input/output unit 51.

Arithmetic units include an ALU, a barrel shifter, a priority encoder, a counter, and a shift register. The registers and the main arithmetic units are connected through three buses, and one micro instruction for directing operation between registers is processed in two clocks.

In the case where an access to the memory outside the CPU is required at the data operation, the address is outputted from the address output circuit 52 to the outside of the CPU through the external bus interface unit 6 under the control of the microprogram, and the target data is fetched through the data input/output circuit 51.

In the case where data is stored in the memory outside the CPU, the address is outputted from the address output circuit 52 through the external bus interface unit 6, and simultaneously the data is outputted from the data input/output circuit 51 to the outside of the CPU.

In order to efficiently perform an operand store, a four-byte store buffer is installed in the data operation unit 8.

In the case where the data operation unit 8 obtains a new instruction address by processing a jump instruction or an exceptional processing, this is outputted to the instruction fetch unit 1 and the PC calculation unit 7.

(1.7) "External Bus Interface Unit"

The external bus interface unit 6 controls communication through the external bus of the integrated circuit of the present invention. All accesses to memories are performed in a clock-synchronized manner, and can be performed in a minimum of two clocks cycle.

Access requests to memory are generated independently from the instruction fetch unit 1, the operand address calculation unit 5 and the data operation unit 8. The external bus interface unit 6 arbitrates these memory access requests.

Furthermore, access to data located at misaligned words, i.e., memory address which involve crossing over the word boundary of 32 bits (one word) which is the size of the data bus connecting the memory to the CPU is performed in a manner that crossing over the word boundary is automatically detected in this block and the access is decomposed into memory accesses over two steps.

This unit also performs conflict preventing processing and by-pass processing from the store operand to the fetch operand in the case where the operand to be pre-fetched and the operand to be stored are superposed.

(2) "Layout Configuration"

In the integrated circuit of the invention, respective function blocks mentioned above are integrated on a single rectangular chip of 11.47 mm×8.89 mm as one embodiment.

Figure 5:
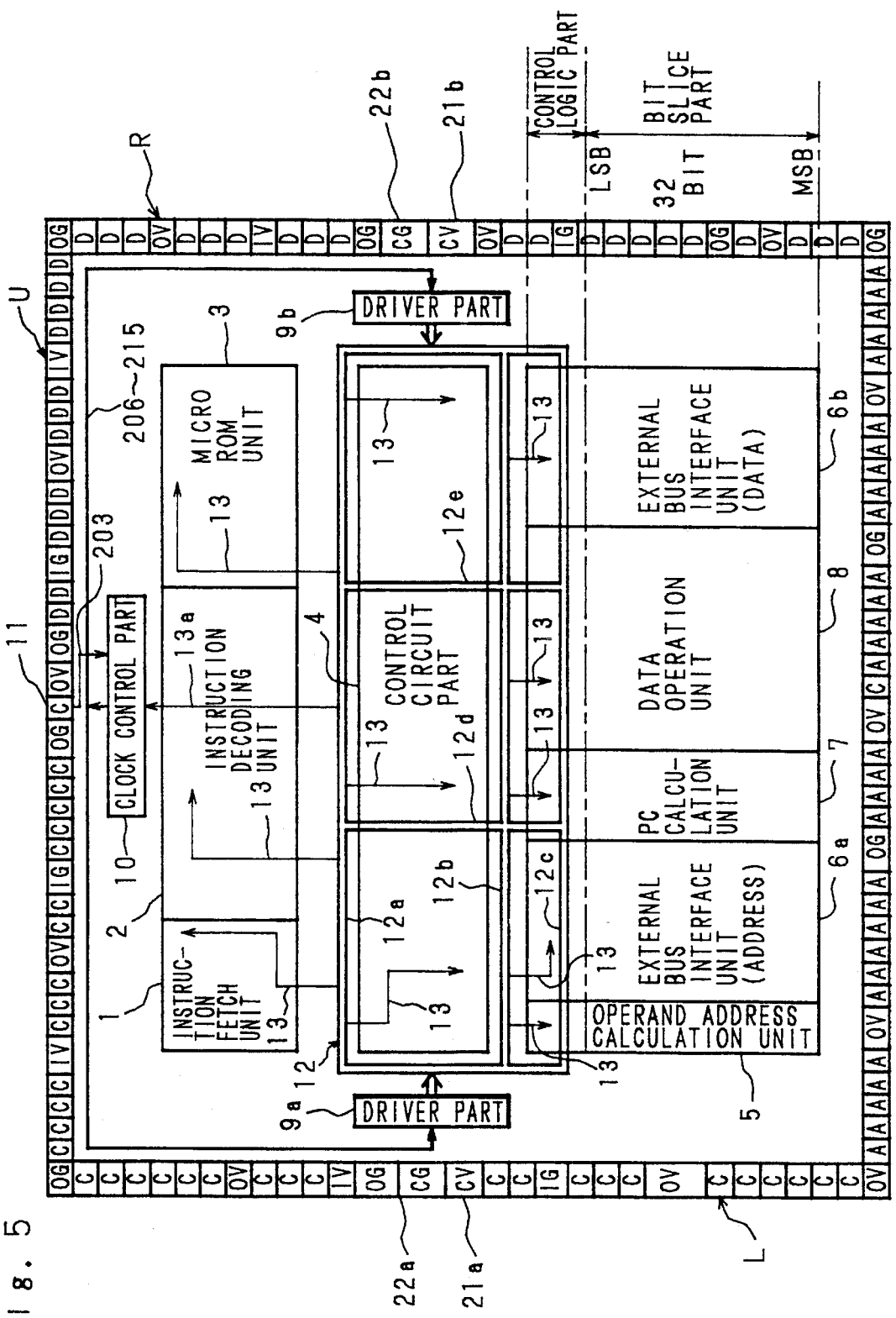
FIG. 5 is a schematic view showing one example of on-chip layouts of the integrated circuits of the invention.

FIG. 5 is a schematic view showing an on-chip layout of an integrated circuit of the invention.

On the chip, the function blocks such as the instruction fetch unit 1, instruction decoding unit 2, micro Rom unit 3, operand address calculation unit 5, PC calculation unit 7, data operation unit 8, and external bus interface unit 6 are laid out.

The external bus interface unit 6 are divided into two blocks of a block 6a relating to address and a block 6b relating to data. A control circuit portion 4, that is, a block made up by integrating part of respective control circuits in function blocks is also laid out.

In FIG. 5, besides the above portions, following elements are also shown: various kinds of pads for transmitting and receiving signals between the interior and exterior of the chip (A: address pad, D: data pad, C: control pad, IV: power source pad for internal logic, IG: grounding pad for internal logic, OV: power source pad for input/output buffer, OG: grounding pad for input/output buffer, CV: power source pad for clock drivers, CG: grounding pad for clock drivers), clock drivers 9 and 10 which generate a non-overlapping two-phase internal clock used in the chip, clock wirings 12 and 13 which supply the internal clock outputted from the clock drivers 9 and 10, to the interior of the chip.

(2.1) "Layout Block Configuration"

For convenience of explanation, using up-and-down and right-and-left relations of FIG. 5, the layout block configuration of the integrated circuit of the invention will be explained.

The chip is configured of three stages of an upper stage, a middle stage and a lower stage.

Between the upper and middle stages and between the middle and lower stages are wiring areas for wiring among the layout blocks.

On the upper stage, the instruction fetch unit 1, instruction decoding unit 2, and micro Rom unit 3 are laid out in this order from the left.

On the middle stage, the control circuit portion 4 is disposed. On the lower stage, the operand address calculation unit 5, external bus interface portion (relating to address 6a, PC calculation unit 7, data operation unit 8 and the external bus interface portion (relating to data) 6b are laid out in this order from the left.

All the layout blocks disposed on the lower stage treat address or data of 32 bits. Each of these blocks is configured of a bit slice portion having bit slices of 32-bit and a control logic portion which controls the bit slice portion. On the chip layout, the control logic portion and the bit slice portion are separately disposed, the former on the upper side and the latter on the lower side.

In the bit slice portion, each bit is aligned in up and downward in bit order in which the LSB is uppermost and the MSB is down most.

(2.2) "Pad Layout"

The pads are laid out on the periphery of the chip. The pads include signal pads such as the address pad (A) that outputs addresses, the data pad (D) that performs data input/output and pad for signal such as the control pad (C) that performs input/output of the control signals such as output or interruption of a strobe signal for addresses and data.

In FIG. 5, a clock pad 11 that is the control pad (C) for inputting the external clock is shown with distinction from the other pads.

Besides the pads for signals, there are a power source pad and a grounding pad.

In the integrated circuit of the invention, the power source wiring and the grounding wiring are divided into three systems for the internal logic circuits, for the input/output buffers and for the clock drivers, thus the power source pads and the GND pads include pads for internal logic circuits (IV and IG), for input/output buffers (OV and OG) and for clock drivers (CV and CG) corresponding the three system.

It has been already described that there are three kinds of pads for signals, that is, the address pad (A), the data pad (D) and the control pad (C), and these pads are sorted in each kind and collectively disposed.

As shown in FIG. 5, the address pads (A) are disposed on the down side portion D of the chip. The data pads (D) are laid out on the right side portion R and the right of the up side portion U. The control pads (C) are disposed on the left side portion L and the left of the up side portion U. The pads (CV and CG) for clock driver are laid out in the center of the up side portion U of the chip. The power source pads (IV, OV and CV) and the GND pads (IG, OG and CG) are allocated at a rate of 1 pad per 4 through 5 pads of these signal pads.

(2.3) "Clock Driver"

Figure 6:
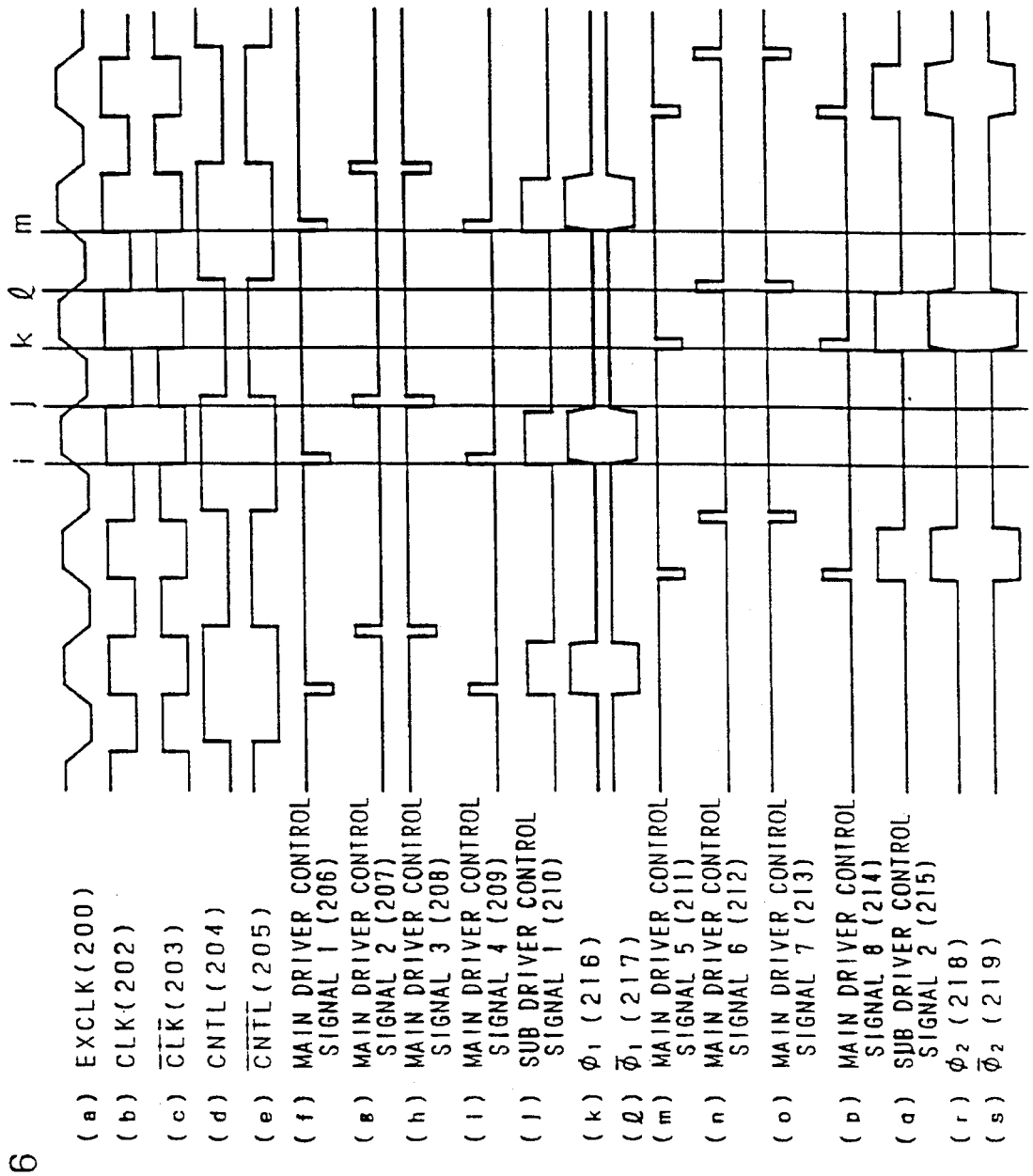
FIG. 6 is a timing chart for explaining clock driver operations.

The circuitry inside the chip operates in synchronization with the internal clock. As the internal clock, four of non-overlapping two phase clocks $\phi_1$ and $\phi_2$ and their inversion signals $\overline{\phi_1}$ and $\overline{\phi_2}$ are used which are shown in FIG. 6 (k), (v) and (l), (s).

The clock driver generates these internal clocks. The clock driver has a circuit configuration in which controls by receiving the feed-back of the internal clock that is its own output and does not cause a passing current at the driver portion thereof.

The clock driver is divided into three layout blocks, the first of which is the clock pad 11 included a clock input buffer, the second of which is a driver portion 9 (9a and 9b)

that is configured of a final stage drive transistor that actually drive the internal clock and the third of which is a clock control portion 10 configured of other control logic circuits. The driver portion 9 is further divided into two layout blocks 9a and 9b by equally dividing the drive transistors into two parts.

Each layout block configuring the clock driver is disposed as follows.

One (9a) of the bisected drivers 9a and 9b is disposed on the middle stage on the left side L of the chip, the other (9b), on the middle stage on the right side R.

The clock control portion 10 is disposed in the center of the area along the up side portion U of the chip. The clock pad 11 is laid out just above the clock control portion 10.

The clock control portion 10 and the driver portion 9 (9a and 9b) are connected by ten of clock control lines 206 through 215 wired along the inside of the pads.

In the wiring of the clock control lines 206 through 215, the wiring length from the control portion 10 to the driver portion 9a on the middle stage on the left side portion L and the wiring length from the control portion 10 to the driver portion 9b on the middle stage on the right side portion R are almost equalized by disposing the control portion 10 in the center of the area along the up side portion U of the chip.

In areas adjacent to the two driver portion 9a and 9b, power source pads (CV) 21a and 21b for the clock drivers and GND pad (CG) 22a and 22b for the clock drivers are disposed. Among these pads 21a, 21b, 22a and 22b, the power source pad 1a and the GND pad 22a for the clock driver on the left side L portion are connected with the driver portion 9a on the side of the left side portion L and the power source pad 21b and the GND pad 22b for the clock driver on the right side R portion are connected with the driver portion 9b on the side of the right side portion R.

Figure 7:
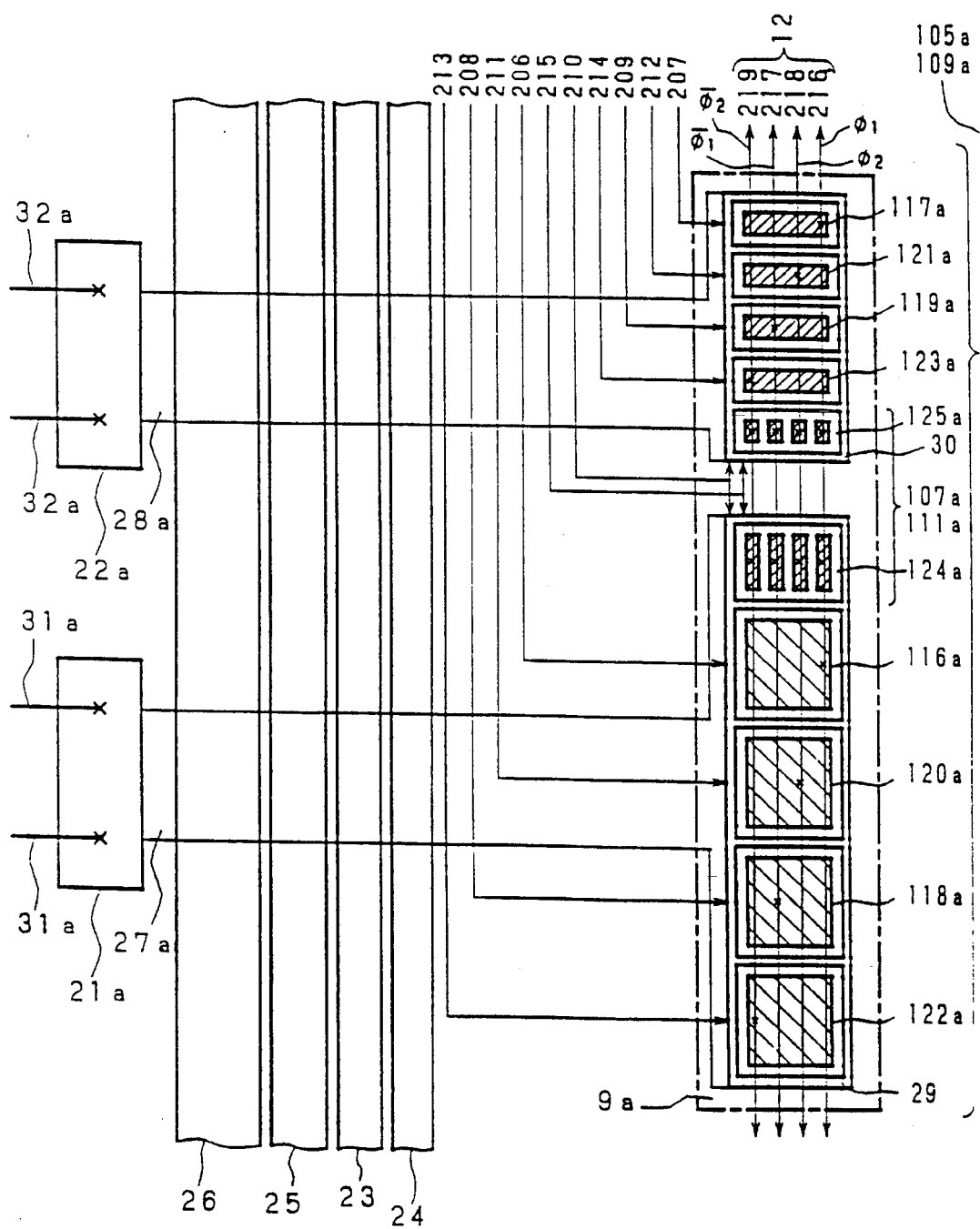
FIG. 7 is an enlarged schematic diagram showing an area containing clock drivers of the on-chip layout of the invention.

FIG. 7 is a schematic view showing a layout configuration of an area near one side (left side portion L of the chip) containing the driver portion 9a, power source pad 21a and GND pad 22a for the clock driver. The other area near other side (right side portion R of the chip) containing the driver portion 9b and so on has the same configuration and both areas are symmetrical with regard to the vertical center line. Further, equivalent members in both the areas are given the same reference numbers each and the left side portion L of the chip is given a letter "a" and the right side R, a letter "b".

The power source pad 21a for the clock driver is bonded with double wires 31a and 31a on the exterior of the chip and the GND pad 22a for the clock driver is bonded with double wires 32a and 32a on the exterior of the chip. Further a power source wiring 27a extending from the power source pad 21a for the clock driver is connected with only the driver portion 9a, and in the same way a GND wiring 28a extending from the GND pad 22a for the clock driver is connected with only the driver portion 9a.

This is the same as to the driver portion 9b, power source pad 21b and the GND pad 22b for the clock driver which are disposed on the middle stage on the right side portion R on the chip.

Then, a layout configuration of the driver portion 9 (9a and 9b) will be explained.

The layout configuration of the driver portion 9a disposed on the middle stage on the left side portion L on the chip is also shown in FIG. 7.

The driver portion 9a is configured of main drivers 105a and 109a which mainly charge and discharge the internal clock and subdrivers 107a and 111a which mainly keep the level of the internal clock after the charge and after discharging by the main drivers 105a and 109a. Further, in FIG. 7, the range, which is subtracted by the range shown with reference symbols 107a and 111a from the range shown with reference symbols 105a and 109a is a real portion of the main drivers 105a and 109a.

Concerning the size of each driver, in the main driver, P(W/L)=2200/1, N(W/L)=800/1; in the subdriver, P(W/L)= 100/1, N(W/L)=50/1, where the unit for L (length) and W (width) is μm and P denotes a P-channel transistor and N, an N-channel transistor.

The main driver 105a and 109a is configured of large size transistors 116a through 123a to charge and discharge a heavy load of the internal clock at high speed. Each of these transistors 116a through 123a is surrounded by a guard ring 29 or 30.

The subdriver 107a and 111a is used for only keeping the level of the internal clock, thus it is made up by a smaller size transistor 124a and 125a than that of the main driver 105a and 109a. The transistors 124a and 125a which make up the respective subdrivers are collectively surrounded by the guard ring 29 or 30.

The layout configuration containing the main driver 105a and 109a and the subdriver 107a and 111a is the same as the driver portion 9b disposed on the middle stage on the right side portion R on the chip.

(2.4) "Clock Wiring"

In the integrated circuit of the invention, the internal clocks $\phi_1$, $\phi_2$, $\bar{\phi}_1$ and $\bar{\phi}_2$ outputted from the clock driver are wired in the chip by using four aluminum wirings 216, 218, 217 and 219 each having 10 μm width. The internal clock wiring is formed in a loop as mentioned later and is called a clock loop trunk line 12.

The clock loop trunk line 12 is configured of a clock trunk line 12a disposed in a wiring area between the upper and middle stages of the chip and of a clock trunk line 12b disposed in a wiring area between the middle and lower stages.

There clock trunk lines 12a and 12b are connected to the respective driver portions 9a and 9b at the left and right end portions of the chip and form the clock loop trunk line 12 as a whole.

Some of other auxiliary clock trunk lines are provided on the chip.

In the left and right directions of the chip, a clock trunk line 12c having a 6 μm width aluminum wiring is disposed in a boundary area between the control logic portion and the bit slice portion on the lower stage and connected to the outputs of the driver portions 9a and 9b at the left and right end portions of the chip. In the up and down directions of the chip, two of clock trunk lines 12d and 12e are provided. The clock trunk line 12d extends from the underside of the instruction decoding unit 2 to the PC calculation unit 7 and the clock trunk line 12e extends from the underside of the boundary between the instruction decoding unit 2 and the micro Rom unit 3 to the underside of the control logic portion of the data operation unit 8.

These two clock trunk lines 12d and 12e are both 8 μm width aluminum wirings. The clock trunk lines 12d and 12e extending in the up and won directions interconnect with the three clock trunk lines 12a, 12b and 12c extending in the left and right directions, thus the clock loop trunk line 12 is formed into a mesh as a whole.

Thus, the internal clock is distributed to each part of the chip by the clock loop trunk line 12 and further, the clock loop trunk line 12 is connected with each transistor on the chip by a 2 μm aluminum wiring called a clock branch line 13.

(3) "Circuit Configuration of Clock Driver"

Figure 8:
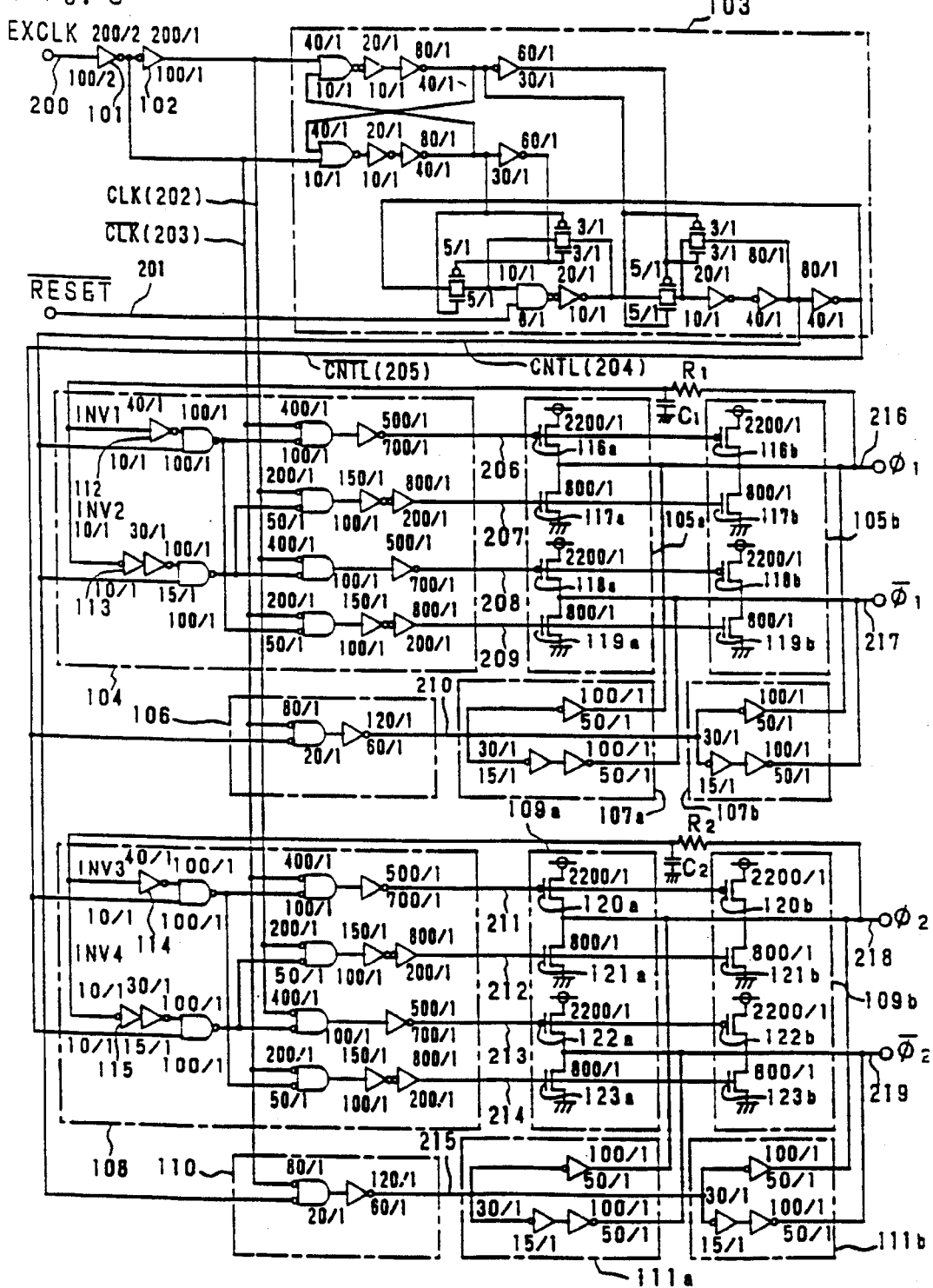
FIG. 8 is a schematic diagram showing a circuit configuration of a clock driver.

FIG. 8 is a schematic diagram showing a circuit configuration of the clock driver.

As already mentioned, the clock driver comprises the clock control portion 10 and the driver portion 9. The driver portion 9 is bisected into the two parts that are 9a on the left side portion L of the chip and 9b on the right side portion R. Further, each driver portion 9a and 9b is configured of the main driver 105a and 109a (105b and 109b) and the subdriver 107a and 111a (107b and 111b).

The main driver 105a and 109a (105a and 109b) mainly charges and discharges the internal clock and the subdriver 107a and 111a (107b and 111b) mainly keep the level of the internal clock after the finish of the charge and discharge by the main driver 105a and 109a (105b and 109b).

The clock driver is configured of a clock input buffer 101, inverter 102, frequency ½ divider 103, main driver control portion 104 and 108, final stage main driver 105a and 109a (105b and 109b), subdriver control portion 106 and 110, final stage subdriver 107a and 111a (107b and 111b), and the like.

The clock input buffer 101 is included in the clock pad 11, and outputs a clock $\overline{CLK}$ to a signal line 203 in response to the external clock EXCLK as an input inputted from the exterior through a signal line 200.

The inverter 102 is included in the clock control portion 10, and outputs a clock CLK to a signal line 202 in response to the clock $\overline{CLK}$ as an input inputted from the clock input buffer 101 through the signal line 203.

The frequency ½ divider 103 is included in the clock control portion 10, and receives the clocks CLK and $\overline{CLK}$ from the respective signal lines 202 and 203 as the inputs and produces ½ frequency clock signals from the clock CLK and $\overline{CLK}$ and outputs them as control signals CNTL and $\overline{CNTL}$ for phase control to a signal lines 204 and 205.

The main driver control portion 104 and 108 is included in the clock control portion 10, and receives the clocks CLK and $\overline{CLK}$ and control signals CNTL and $\overline{CNTL}$ from the respective signal lines 202, 203, 204 and 205 as the inputs and further receives the feed back of the internal clock $\phi_1$ and the $\phi_2$ from respective signal lines 216 and 218 as the inputs and generates a main driver control signal in response to these signals and outputs it to signal lines 206 through 209 and 211 through 214.

The final stage main driver 105a and 109a (105b and 109b) is included in the driver portion 9, and charges and discharges the internal clock in response to the main driver control signal inputted through the signal lines 206 through 209 and 211 through 214.

The subdriver control portion 106 and 110 is included in the control portion 10, and receives the clock $\overline{CLK}$, control signals CNTL and $\overline{CNTL}$ as the inputs through the respective signal lines 203, 204 and 205 and generates a subdriver control signal and outputs it to signal lines 210 and 215.

The final stage subdriver 107a and 111a (107b and 111b) is included in the driver portion 9, and receives the respective subdriver control signals 210 and 215 as the inputs through the respective signal lines 210 and 215 and keeps the level of the internal clock.

As already mentioned in the paragraph "Layout Configuration", in the integrated circuit of the invention, the driver portion 9 of the clock driver is divided into the two parts 9a and 9b. Corresponding to this division, the drive transistors are divided into two groups in the clock driver circuit of FIG. 8. The sizes of the two-grouped drive transistors are as explained in "Layout Configuration", and in the main driver, P(W/L)=2200/1, N(W/L)=800/1 and in the subdriver, P(W/L)=100/1, N(W/L)=50/1, where the unit of L or W is μm.

The main driver control portion 104 and 108 is fed back by the internal clock $\phi_1$ and $\phi_2$ through a signal line 216 and 218. As the inverters which directly receive the feed back signals, two types of inverters are provided one of which is INV1(112) and INV3(114) having W sizes P/N=40/10 and the other, INV2(113) and INV4(115) having P/N=10/10 (unit: μm).

In a standard inverter, generally the P/N ratio is set to 2:1 and the logical $V_{TH}$ is set to 0.5 Vcc, but in the present inverters 112, 114, 113 and 115, by giving them a different P/N ratio from that of the standard type, the logical $V_{TH}$ of the inverter INV1(112) and INV3(114) having P/N=40/10 is set to 0.6 Vcc, and as to the inverter INV2(113) and INV4(115) having P/N=10/10, the VTH is set to 0.4 Vcc.

The abovementioned is the explanation of the circuit configuration of the clock driver.

Eight of the main driver control signal lines 206 through 209 and 211 through 214 and two of the subdriver control signal lines 210 and 215 correspond to ten of the clock control lines connecting the clock control portion 10 and the driver portion 9 in the layout.

The feed back signal of the internal clock $\phi_1$ and $\phi_2$ is taken out from the center of the clock trunk line 12a disposed in the wiring area between the upper and middle stages, and the feed back is performed through the clock branch line 13a which vertically penetrates the instruction decoding unit 2 and extends to the clock control portion 10.

In addition, $C_1$, $C_2$ and $R_1$, $R_2$ in the feed back route of the circuit diagram of FIG. 8 show wiring capacities and wiring resistances of the feed back clock branch line 13a.

(4) "Operation of Clock Driver"

In the clock driver of the integrated circuit of the invention, the final stage main driver 105a and 109a (105b and 109b) receives the main driver control signal through the respective signal lines 206 through 209 and 211 through 214, and a P channel transistor and N channel transistor independently perform ON/OFF.

The main driver control portion 104 and 108 turns on the P channel transistor to charge a node of the internal clock when the internal clock changes from L (low level) to H (high level) and turns off the P channel transistor when the node of the internal clock goes H, receiving its feed back.

Further, the main driver control portion 104 and 108 turns on the N channel transistor to discharge the node of the internal clock when the internal clock changes from H to L and turns off the N channel transistor when the node of the internal clock goes L, receiving its feed back.

By feeding back the internal clock to the main driver control portion 104 and 108 in this way, the period of simultaneous ON of the P channel transistor and N channel transistor is eliminated. In the period of simultaneous OFF of the P channel transistor and N channel transistor, the subdriver 107a and 111a (107b and 111b) keeps the level.

FIG. 6 is a timing chart showing an operative condition of the clock driver. The operation of the clock driver will be explained referring to FIG. 6.

At the time i, the external clock EXCLK (a) rises, the clock CLK (b) on the signal line 202 goes high level (→H), the clock $\overline{CLK}$ (c) on the signal line 203 goes low level (→L).

At this time, $\phi_1$=L (k) on the signal line 216, thus the main driver control signal 1 (f) and 4 (i) on the signal lines 206 and 209 is asserted. Thereby, among the drive transistors of the final stage main driver 105a and 109a (105b and 109b) the P channel transistor which makes $\phi_1$ (k) high level H and the N channel transistor which makes $\phi_1$ (l) low level L are turned on and $\phi_1$ goes high level ($\phi_1$→H), and $\phi_1$ goes low level ($\phi_1 \rightarrow$L). After that, $\phi_1$=H is fed back to the inverter INV1 (112) through the feed back clock branch line 13a, and the main driver control signals 1 and 4 on the signal lines 206 and 209 are negated.

The logical VTH of the inverter INV1 (112) is set to 0.6 Vcc, thus the main driver control signals 1 and 4 on the signal line 206 and 209 are negated after the input to the inverter INV1 (112) became more than 0.6 Vcc. As a result, all the transistors of the final stage main driver 105 and 109 are turned off.

Because $\overline{\text{CNTL}}$=L (e) on the signal line 205, the main driver control signals 5 through 8 on the signal lines 211 through 214 are not asserted and all the drive transistors of the final stage main driver 105a and 109a (105b and 109b) for the clocks $\phi_2$ (r), $\overline{\phi_2}$ (s) on the signal line 218 and 219 are turned off.

At this time, the output of the subdriver control signal 1 (j) to the signal line 210 is H, and the output of the subdriver control signal 2 (q) to the signal line 215 is L, thus the output of the final stage subdriver 107a and 111a (107b and 111b) results in $\phi_1$=H, $\overline{\phi_1}$=L, $\phi_2$=L and $\overline{\phi_2}$= H.

Thus, the internal clocks become $\phi_1$=H, $\overline{\phi_1}$=L, $\phi_2$=L and $\overline{\phi_2}$=H.

At the time j, the external clock EXCLK (a) falls and the clock CLK (b) on the signal line 202 goes L, and the clock $\overline{\text{CLK}}$ (c) on the signal line 203 goes H.

At this time, $\phi_1$=H (k) on the signal line 216, thus the main driver control signal 2 (g) and 3 (h) on the signal lines 207 and 208 are asserted. Thereby, among the drive transistors of the final stage main driver 105a and 109a (105b and 109b) the N channel transistor which makes $\phi_1$ low level L and the P channel transistor which makes $\overline{\phi_1}$ high level H are turned on and $\phi_1$ goes low level ($\phi_1 \rightarrow$L) and $\overline{\phi_1}$ goes high level ($\overline{\phi_1} \rightarrow$H). After that $\phi$=L is fed back to the inverter INV2 (113) through the branch line 13a for feed back, and the main driver control signals 2 and 3 on the signal lines 207 and 208 are negated.

The logical $V_{TH}$ of the inverter INV2 (113) is set to 0.4 Vcc, thus the main driver control signals 2 and 3 on the signal lines 207 and 208 are negated after the input to the inverter INV2 (113) became less than 0.4 Vcc. As a result, all the drive transistors of the final stage main driver 105a and 109a (105b and 109b) are turned off.

Because $\overline{\text{CNTL}}$=L (e) on the signal line 205, the main driver control signals 5 through 8 on the signal lines through 214 are not asserted and all the drive transistors of the final stage main driver for the clock $\phi_2$ (r), $\overline{\phi_2}$ (s) on the signal line 218 and 219 remain turned off.

At this time, the output of the subdriver control signal 1 (j) to the signal line 210 is L, and the output of the subdriver control signal 2 (q) to the signal line 215 is L, thus the output of the final stage subdriver 107a and 111a (107b and 111b) results in $\phi_1$=L, $\overline{\phi_1}$=H, $\phi_2$=L and $\overline{\phi_2}$= H.

Thus, the internal clocks become $\phi_1$=L, $\overline{\phi_1}$=H, $\phi_2$=L and $\overline{\phi_2}$=H. After that, CNTL=L, and $\overline{\text{CNTL}}$=L result.

At the time K, the external clock EXCLK (a) rises and the clock CLK (b) on the signal line 202 goes H and the clock $\overline{\text{CLK}}$ (c) on the signal line 203 goes L.

At this time the control signal $\overline{\text{CNTL}}$=L (d) on the signal line 204, thus the main driver control signal 1(f) through 4(i) on the signal lines 206 and 209 are not asserted. Thereby, all the drive transistors of the final stage main driver 105a and 109a (105b and 109b) for the clocks $\phi_1$ and $\overline{\phi_1}$ are turned off.

At this time, because $\phi_2$=L, the main driver control signals 5 (m) and 8 (p) on the signal lines 211 and 214 are asserted. Therefore, among the drive transistors of the final stage main driver 105a and 109a (105b and 109b) the P channel transistor which makes $\phi_2$ high level H and the N channel transistor which makes $\overline{\phi_2}$ low level L are turned on and $\phi_2$ goes high level H ($\phi_2 \rightarrow$H) and $\overline{\phi_2}$ goes low level L($\overline{\phi_2} \rightarrow$L).

After that $\phi_2$=H is fed back to the inverter INV3 (114) through the clock branch line 13a for feed back, and the main driver control signals 5 and 8 on the signal lines 211 and 214 are negated.

The logical $V_{TH}$ of the inverter INV3 (114) is set to 0.6 Vcc, thus the main driver control signals 5 and 8 on the signal lines 211 and 214 are negated after the input to the inverter INV3 (114) became more than 0.6 Vcc. As a result, all the drive transistors of the final stage main driver 105a and 109a (105b and 109b) are turned off.

At this time, the output of the subdriver control signal 1 (j) to the signal line 210 is L, and the output of the subdriver control signal 2 (q) to the signal line 215 is thus the output of the final stage subdriver 107a and 111a (107b and 111b) results in $\phi_1$=L, $\overline{\phi_1}$=H, $\phi_2$=H and $\overline{\phi_2}$= L. Thus the internal clocks become $\phi_1$=L, $\overline{\phi_1}$=H, $\phi_2$=H and $\overline{\phi_2}$=L.

At the time 1, the external clock EXCLK (a) falls and the clock CLK (b) on the signal line 202 goes L, and the clock $\overline{\text{CLK}}$ (c) on the signal line 203 goes H.

At this time the control signal $\overline{\text{CNTL}}$=L (d) on the signal line 204, thus the main driver control signal 1(f) through 4(i) on the signal lines 206 and 209 are not asserted. Thereby all the drive transistors of the final stage main driver 105a and 109a (105b and 109b) for clocks $\phi_1$ and $\overline{\phi_2}$ remain turned off.

At this time, because $\phi_2$=H, the main driver control signals 6 (n) and 7 (j) on the signal lines 212 and 213 are asserted. Therefore, among the drive transistors of the final stage main driver 105a and 109a (105b and 109b) the N channel transistor which makes $\phi_2$ low L and the P channel transistor which makes $\overline{\phi_2}$ high level H are turned on and $\phi_2$ goes low level ($\phi_2 \rightarrow$L) and $\overline{\phi_2}$ goes high level H ($\overline{\phi_2}$=H).

After that $\phi_2$=L is fed back to the inverter INV4 (115) through the clock branch line 13a for feed back and the main driver control signals 6 and 7 on the signal lines 212 and 213 are negated.

The logical $V_{TH}$ of the inverter INV4 (115) is set to 0.4 Vcc, thus the main driver control signals 6 and 7 on the signal lines 212 and 213 are negated after the input to the inverter INV4 (115) became more than 0.4 Vcc. As a result, all the drive transistors of the final stage main driver 105a and 109a (105b and 109b) are turned off.

At this time, the output of the subdriver control signal 1 (j) to the signal line 210 is L, and the output of the subdriver control signal 2 (q) to the signal line 215 is L, thus the output of the final stage subdriver 107a and 111a (107b and 111b) results in $\phi_1$=L, $\overline{\phi_1}$=H, $\phi_2$=L and $\overline{\phi_2}$= H. Thus the internal clocks become $\phi_1$=L, $\overline{\phi_1}$=H, $\phi_2$=L and $\overline{\phi_2}$=H.

After that, CNTL=H and $\overline{\text{CNTL}}$=L result.

Through the above operations, one cycle of the clock is finished and the clock driver repeats in order the operations at the times i, j, k, l and m after the time m.

As mentioned above, according to the integrated circuit of the invention, in the first invention, the hierarchical tree structure is not used for the circuit configuration of the internal clock signal distribution, but the large capacity driver performs centralized clock supply, thus the transistor stages from input of the external o output of the internal clocks are reduced and the phase difference between the two clocks is minimized.

Further, in the first invention, the clock driver which outputs the internal clock signal is supplied with power and the grounding (GND) through the dedicated power source wiring and grounding (GND) wiring (the wirings of the first and second potential) separated from other circuits, therefore the impedance of the power source wiring and GND wiring of the clock driver is low and the high frequency characteristics of the clock driver is improved, together with the noise generated by high speed drive of the internal clock having a heavy load is hardly propagated to the other power supplies and GNDs and the other circuits are protected against the noise from the clock driver.

In the second invention, the clock driver which outputs the internal clock signal is surrounded by the guard ring and separated from other portions of the chip, thus latch up due to effect of the noise from the power supplies and GND lines of low impedance can be avoided and also the noise generated by high speed drive of the internal clock having a heavy load is hardly propagated to the other portions through the substrate, thus the other circuits hardly receive the effect of the noise.

In the third invention, the clock driver which outputs the internal clock signal is supplied with the power and grounding through the dedicated power source pad and grounding pad bonded with the double wires, therefore the impedance of the power source wiring and grounding wiring of the clock driver is low, and the frequency characteristics of the clock driver is improved. Further, the noise generated by high speed drive of the internal clock having a heavy load is hardly propagated to the other power supplies and GNDs and the other circuits are protected against the noise from the clock driver.

In the fourth invention, the clock control portion disposed along the first side of the chip outputs the clock control signal, and in response to input of this control signal the clock drivers, which are bisected and disposed along the second and third sides each approximately equidistant from the control portion, output the internal clock signals, therefore the internal clock signals are outputted from the two opposing positions on the chip, thereby the distances between respective portions and the clock driver on the chip are averaged and the internal clock skew on the chip is minimized.

In the fifth invention, the internal clock signal outputted from the bisected clock driver is distributed to the large areas on the chip through the loop-shaped clock loop trunk line and further to the respective portions through a plurality of the clock branch lines branched from the loop trunk line, therefore, the internal clock signal skew on the chip due to wiring delay is reduced and the clock with approximately the same phase is obtained at any point of the chip.

In the sixth invention, after passing through the clock branch line, the internal clock signal is fed back to the MOS transistor, which makes the internal clock signal low level, through the first inverter set to the low logical VTH, together with fed back to the MOS transistor, which makes the internal clock signal high level, through the second inverter set to the high logical $V_{TH}$. Therefore, the feed back is performed after the internal clock signal has fully changed, and the main driver maintains an on-state until the internal clock signals have fully changed to respective high level and low level.

In the seventh invention, the main driver drives the internal clock only during the time interval from the external clock signal change to the internal clock signal change to always turn off either the P channel transistor or the N channel transistor and the internal clock is outputted by only the subdriver during the other interval, therefore the passing current is prevented from flowing between the power source and the grounding GND during switching of the main driver having large size transistors, therefore the demand power can be reduced.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraces by the claims.

What is claimed is:

1. An integrated circuit formed on a single rectangular chip, said chip comprising:

a pad coupled to an external clock signal;

a first edge;

second and third edges adjoining said first edge;

a first circuit which outputs a derived clock signal in response to said external clock signal, said first circuit formed substantially near said first edge; and two of a second circuit, each coupled to said first circuit, each of which outputs an internal clock signal in cooperation with the other in response to said derived clock signal, one of said second circuits formed substantially near said second edge, the other of said second circuits formed substantially near said third edge;

wherein said internal clock signals of said second circuits are coupled to each other and input to said first circuit.

* * * * *

UNITED STATES PATENT AND TRADEMARK OFFICE
CERTIFICATE OF CORRECTION

PATENT NO. : 5,497,109
DATED : March 5, 1996
INVENTOR(S) : Nobuhiko Honda, et al.

It is certified that error appears in the above-indentified patent and that said Letters Patent is hereby corrected as shown below:

On the title page, item "[75] Inventors:", change "Nubuhiko" to --Nobuhiko--

Signed and Sealed this

Twenty-sixth Day of November 1996

Attest:

BRUCE LEHMAN

Attesting Officer

Commissioner of Patents and Trademarks